(12) United States Patent
Johnson et al.

(10) Patent No.: US 6,971,046 B1
(45) Date of Patent: Nov. 29, 2005

(54) SYSTEM AND METHOD FOR PERFORMING INPUT/OUTPUT DIAGNOSTICS

(75) Inventors: Craig B. Johnson, Shoreview, MN (US); Carl R. Crandall, Hugo, MN (US); Haeng D. Park, St. Paul, MN (US)

(73) Assignee: Unisys Corporation, Blue Bell, PA (US)

( * ) Notice: Subject to any disclaimer, the term of this patent is extended or adjusted under 35 U.S.C. 154(b) by 528 days.

(21) Appl. No.: 10/330,716

(22) Filed: Dec. 27, 2002

(51) Int. Cl.[7] .......................... G06F 11/00
(52) U.S. Cl. ..................... 714/35; 714/25
(58) Field of Search ............... 714/32, 35, 43

(56) References Cited

U.S. PATENT DOCUMENTS 6,615,377 B1 * 9/2003 da Cruz et al. ............. 714/724
6,879,939 B1 * 4/2005 Lang et al. ................. 702/186

* cited by examiner

Primary Examiner—Bryce P. Bonzo
Assistant Examiner—Brian Assessor
(74) Attorney, Agent, or Firm—Charles A. Johnson; Mark T. Starr; Crawford Maunu PLLC

(57) ABSTRACT

A system and method for testing I/O components without requiring initiation of the test I/O requests from the operating system via the instruction stream. An I/O system facilitates I/O operations between a processing system and I/O devices during normal I/O processing. An exerciser initiation queue is established, which corresponds to an operating initiation queue used during normal I/O processing. The I/O system is configured to monitor for test I/O requests on the exerciser initiation queue in lieu of monitoring for standard I/O requests on the operating initiation queue. A testing module enters the test I/O requests on the exerciser initiation queue in a format analogous to standard I/O requests entered on the operating initiation queue during normal I/O processing. The test I/O requests on the exerciser initiation queue are processed via the I/O system. Upon I/O completion, status may be returned to the testing module for processing of test results.

30 Claims, 10 Drawing Sheets

| TEXT FILE SCRIPT 500 | | | |
|---|---|---|---|
| TYPE 502 | DISK ID 504 | STARTING DISK ADDRESS 506 | SIZE 508 |
| WRITE | DISK-A | FFFF 0000 | FF |
| READ | DISK-A | FFFF 0000 | FF |
| READ & VERIFY | DISK-B | FFFF 1000 | FFF |
| WRITE, READ, VERIFY | DISK-D | 8000 0000 | FFFF |
| | | | |
| | | | |
| | | ⋮ | |
| | | | |

510 — WRITE row
512 — READ row
514 — READ & VERIFY row
516 — WRITE, READ, VERIFY row

*FIG. 5*

SYSTEM AND METHOD FOR PERFORMING INPUT/OUTPUT DIAGNOSTICS

CROSS-REFERENCE TO OTHER PATENT APPLICATIONS

The following co-pending patent application of common assignee contains some common disclosure:

"System And Method For Facilitating Use Of Commodity I/O Components In A Legacy Hardware System", Ser. No. 10/034,701, filed Dec. 28, 2001, which in incorporated by reference in its entirety.

FIELD OF THE INVENTION

This invention relates in general to Input/Output (I/O) systems, and more particularly to a system and method for testing I/O components without requiring the test I/O requests to be initiated from the operating system and normal instruction stream.

BACKGROUND OF THE INVENTION

Computer systems ranging from large-scale mainframe computers to personal desktop computers generally implement various types of peripheral or input/output (I/O) devices. The efficient performance of input and output operations is one of the most critical requirements for computer system design. Contemporary large-scale computer systems typically interface with many different attached peripheral devices such as magnetic disk drives, optical disk drives, magnetic tape drives, cartridge tape libraries, and the like. Information may generally be written to, or read from any of these various types of storage components.

Mass storage capabilities have long been a desirable characteristic of medium and large-scale computing systems. Such systems have the ability to connect to a variety of different types and quantities of I/O devices such as random access and sequential storage devices. Due to the potential for extensive I/O processing required for such systems, a robust yet efficient mechanism must be provided to send output to and receive input from such I/O devices. Prior art systems have employed separate I/O processors to relieve the central processing system from a significant amount of I/O processing tasks. In such prior art systems, I/O requests that were issued from a mainframe computer to an external disk or tape drive were often accomplished via a hardware I/O channel attached to the mainframe. The "test" microcode for the I/O channel was developed via software diagnostic tools which were then executed, and finally the operating system was run.

The I/O component device drivers of prior art systems may be associated with the operating system of the central processing system, where the operating system builds commands to provide to an I/O module to drive the channel. The operating system thus accounts for any physical attributes of the device being accessed. In this type of design configuration, a new channel results in a need for an operating system change. This requires substantial development efforts to introduce new devices and channels into legacy systems.

These and other problems are addressed with the introduction of a commodity I/O module, as described in co-pending application entitled "System And Method For Facilitating Use Of Commodity I/O Components In A Legacy Hardware System," Ser. No. 10/034,701, assigned to Unisys Corporation, the content of which is incorporated herein by reference. The commodity I/O module overcomes numerous shortcomings of the prior art for purposes of normal I/O operation. However, testing the commodity I/O module via a software diagnostic program using the operating system is inherently complex. Testing the operations and performance of the commodity I/O module via the operating system also lacks flexibility and manageability.

It would therefore be desirable to have a manner of testing such commodity I/O modules that does not require operation through the operating system, and provides greater flexibility and manageability for purposes of debugging, data verification, performance testing and adjustment, etc. The present invention fulfills these and other needs, and offers other advantages over the prior art.

SUMMARY OF THE INVENTION

The present invention is generally directed to a system and method for testing I/O components, such as disk drives, tape drives, and the like, without requiring the test I/O requests to be initiated from the operating system and normal instruction stream.

In accordance with one embodiment of the invention, a method is provided for testing an input/output (I/O) system. The I/O system facilitates I/O operations between a processing system having an operating system (OS) and I/O components during normal I/O processing. The method includes establishing an exerciser initiation queue corresponding to an operating initiation queue used by the processing system during normal I/O processing. The I/O system is configured to monitor for test I/O requests on the exerciser initiation queue in lieu of monitoring for standard I/O requests on the operating initiation queue. The test I/O requests are entered onto the exerciser initiation queue in a format corresponding to the format that the standard I/O requests are entered on the operating initiation queue during normal I/O processing. The test I/O requests on the exerciser initiation queue are then processed via the I/O system.

In accordance with another aspect of the method for testing an I/O system, an exerciser status queue is established, where this exerciser status queue corresponds to an operating status queue used by the processing system during normal I/O processing. Status entries corresponding to the test I/O requests are entered on the exerciser status queue. As test I/O requests are completed, corresponding status entries are put on the exerciser status queue. Status entries on the exerciser status queue that have been designated as completed test I/O requests are monitored, and test results for the completed test I/O requests identified in response to the monitoring for status entries are processed. According to yet another aspect of such an embodiment, shared memory is mapped in order to hide a predetermined memory segment (which may include multiple memory segments) from the operating system. Establishing an exerciser initiation queue in this embodiment includes establishing the exerciser initiation queue in the predetermined memory segment.

In accordance with another embodiment of the invention, a system for testing input/output (I/O) transactions is provided. The system includes one or more I/O devices, and an I/O module coupled to the I/O devices. A test initiation queue is partitioned in memory separate distinct from an operating initiation queue used to process I/O requests during normal I/O transaction processing. An exerciser tester is coupled to the I/O module to provide test I/O requests directly to the I/O module by way of the test initiation queue. The I/O module then processes the test I/O requests on the test initiation queue.

In accordance with another embodiment of the invention, a method is provided for testing I/O operations in an I/O management system that includes a processing module and associated operating system, memory, and one or more I/O components. The method includes entering test I/O requests on an exerciser initiation queue via a request generator. The exerciser initiation queue is created in memory available to the operating system during normal I/O processing, yet unavailable to the operating system during testing. The test I/O requests on the exerciser initiation queue are processed. Status entries are entered on an exerciser status queue, where each of the status entries corresponds to an associated one of the test I/O requests entered on the exerciser initiation queue. The status entries are monitored to identify the test I/O requests that have completed I/O processing, and test results associated with the test I/O requests that have completed I/O processing are processed.

Still other objects and advantages of the present invention will become readily apparent to those skilled in this art from the following detailed description. As will be realized, the invention is capable of different embodiments than those specifically illustrated, and its details are capable of modification without departing from the scope and spirit of the invention. Accordingly, the drawing and description are to be regarded as illustrative in nature, and not as restrictive.

BRIEF DESCRIPTION OF THE DRAWINGS

The invention is described in connection with the embodiments illustrated in the following diagrams.

FIG. 4, including

FIG. 5 is represents an exemplary text file script for a disk exerciser in accordance with the present invention;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized, as structural and operational changes may be made without departing from the scope of the present invention.

Generally, the present invention provides a method for testing Input/Output (I/O) components without requiring the test I/O requests to be initiated from the operating system and normal instruction stream. The present invention may be utilized in connection with a variety of different IO system architectures. For purposes of illustration and not of limitation, a representative Commodity Input/Output (CIO) system architecture in which the principles of the present invention may be applied is described generally below. The representative CIO management system facilitates the use of commodity I/O components in a computing system. The realization and benefits of such a CIO management system may be determined in a manner described herein and in copending U.S. patent application Ser. No. 10/034,701 entitled "System And Method For Facilitating Use Of Commodity I/O Components In A Legacy Hardware System," which was filed on Dec. 28, 2001 and assigned to the assignee of the instant application, the content of which is incorporated herein by reference. However, to obtain an understanding of the commodity I/O diagnostic system and method of the present invention, a representative CIO management system and its normal operating mode is described generally below.

Figure 1:
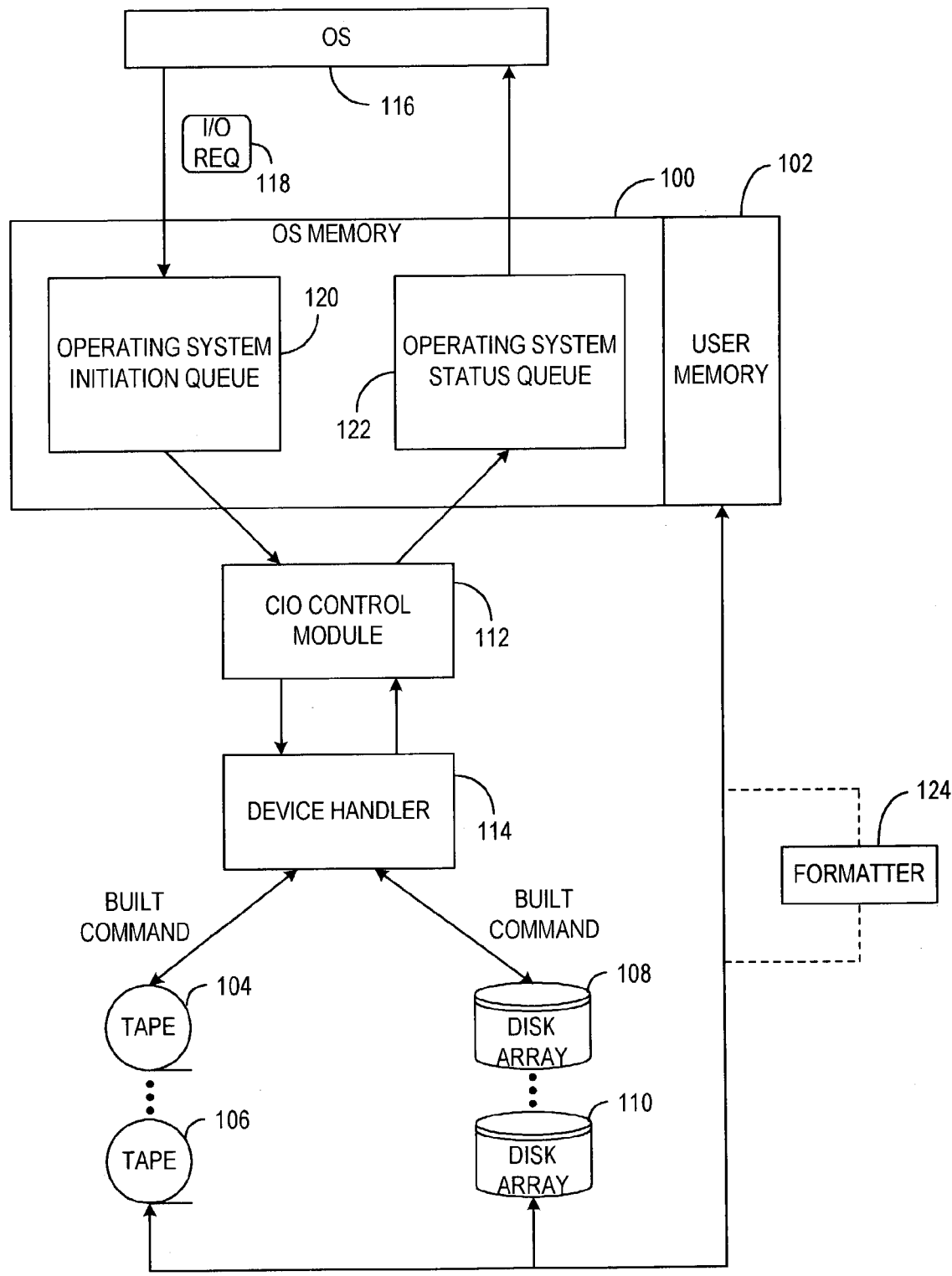
FIG. 1 illustrates the normal operating I/O flow control associated with a representative CIO management system in which the principles of the present invention may be applied.

FIG. 1 illustrates the normal operating I/O flow control associated with a representative CIO management system in which the principles of the present invention may be applied. The system of FIG. 1 facilitates the use of I/O components in a computing system. In the exemplary embodiment of FIG. 1, the hardware I/O interfaces are converted to logical interfaces, which allows for faster development and introduction of new device types and channel types (e.g., Small Computer Systems Interface (SCSI), FIBRE channel, Enterprise Systems Connection (ESCON), etc.) to legacy systems. The operating system using the I/O processor does not need to know or supply the physical characteristics of the device being accessed. The I/O request is based on at least the type of device (e.g., disk, tape, etc.) and a request type (e.g., read, write, etc.). In this manner, the calling element (e.g., operating system) does not need to know whether the connection to the device is through SCSI, FIBRE, ESCON, etc.

In some instances, mainframe and other large computing systems have been replaced by independent computers that can communicate via a network. Where mainframe and other large computers used to provide the best means for coupling remote computers, today's networking technologies have allowed some of those benefits of mainframe computers to be provided via networked commodity computers. However, the data and programs used in connection with such large-scale computers are still very valuable. The resident data can run into the terabytes, and in some cases it may be too expensive to parse and reformat into another format readable by a commodity system. Therefore, it has been a worthwhile undertaking to emulate such operating systems on a modern, commodity operating system. The modern operating systems can run on a wide range of commodity hardware that is inexpensive and easily obtainable. Using emulation, the legacy data can be accessed as needed without requiring maintenance of the hardware that was originally designed to access the data.

Further, the highly reliable design of mainframe operating systems and associated application software is still very useful in many applications. Such operating systems and software can provide features such as data redundancy, data logging, security, business controls, and audits, etc. that may not be available in commodity systems. In contrast, commodity systems have been more focused on performance, usability, and in dealing with hardware advances. By using emulation, the benefits provided by a mainframe operating system can still be realized on less expensive, commodity computer systems.

A central processing system (not shown) and associated memory 100, 102 may represent an emulated system. The OS memory 100 and the user memory 102 may be an integral memory appropriately partitioned, or alternatively may be separate memory components. Such a computer system can emulate the operations of the original system. It may be desirable, however, to be able to implement commodity storage devices, such as commodity tape drives 104, 106 and disk arrays 108, 110 which are readily available on the market. The I/O processing system, including the CIO control module 112 and device handler 114 serves to interface the emulated system and such commodity storage devices 104, 106, 108, 110, etc.

In conventional systems, the device drivers were associated with the operating system (OS) of the central processing system, where the OS built commands to provide to an I/O module to drive the channel. The OS thus accounted for any physical attributes of the device being accessed. In this type of design configuration, a new channel would result in a need for an OS change. In accordance with the representative system of FIG. 1, these tasks are moved to the I/O processing system 112, 114, and the OS 116 is relieved of the need for knowledge of the specific physical attributes of the device being accessed. Such an I/O processing system accomplishes this through the use of a logical interface. The I/O request is based on parameters such as the type of device (e.g., disk or tape), a command (e.g., read, write, etc.), and the amount of data requested. The caller does not need to know whether the connection to the device is through Small Computer System Interface (SCSI), FIBRE, ESCON, etc. Therefore, the I/O processing system removes the physical knowledge of I/O devices from the central processing system OS 116, and converts hardware I/O interfaces to logical interfaces. This allows for faster development, as well as introduction of new device types and channel types to the legacy system.

Such an I/O processing system 112, 114 may be implemented as a program (CioDLL), which runs as an application on a commodity OS such as WINDOWS™. In such an embodiment, CioDLL serves as the Input/Output Processor (IOP) for the emulation system. The CioDLL may be linked, either dynamically or statically, into the emulator to perform functions issued by the host OS 116. The IOP implements a logical I/O interface, such that the host OS I/O requests include information regarding the type of request, the device being requested, the number of words to transfer, etc. The IOP includes the logic to process this request, and to build the appropriate channel type (e.g., SCSI, FIBRE, etc.) commands to be issued. The host OS does not need to know the physical aspects of the device, or channels.

More particularly, the host system memory is visible to the IOP, as shown by the OS memory 100 and user memory 102 which may be implemented as part of the system main memory or a local memory for the OS. The host OS 116 may process a request to access an external storage device. Such a request may be a request to read a file from one of a plurality of disk arrays 108–110, or to read/write a file from/to one of a plurality of tape devices 104–106. The OS 116 takes the file name, and creates I/O requests which will allow the particular transaction to take place. The host OS 116 inputs I/O request entries 118 into the initiation queue 120 which, in one representative embodiment, resides in the OS memory 100.

A CIO control module or "manager thread" 112 handles the processing of I/O requests that are queued to the initiation queue 120, and also returns status of the I/O request to the OS status queue 122. The CIO control module 112 polls for a valid request on the initiation queue 120, which may be accomplished via the CIO control module 112 by periodically initiating a read operation, such as a Direct Memory Access (DMA) read operation, of entries on the OS initiation queue 120. The CIO control module 112 looks for an asserted "valid flag(s)" or other indicator which indicates a valid entry on the initiation queue 120. When an I/O request is found, the thread will indicate that the I/O request is being processed by the IOP. The thread indicates that the I/O request is being processed by clearing the valid flag in the corresponding initiation queue 120 entry.

Processing of any I/O request queued on the initiation queue 120 that is found to have an asserted valid flag is then initiated by the CIO control module 112. This may include obtaining the address of the I/O packet, and accessing the packet information associated with that I/O packet address. For example, if the valid flag is set for a particular I/O request entry on the initiation queue 120, the CIO control module 112 obtains the address where the corresponding packet is located from the queued I/O request information. The corresponding packet can then be accessed, where the packet includes the information required to complete the I/O transaction. The packet information may also be retrieved using a DMA read operation, although any data retrieval operation may be employed.

The CIO control module 112 thread validates the contents of the I/O request packet and reports any errors by writing the status into the I/O request packet and putting an entry on the host system status queue 122. The host OS 116 polls the status queue 122 for I/O completions and processes the valid entries found on the status queue 122.

If the I/O request packet from the initiation queue 120 is valid, the CIO control module 112 calls the appropriate device handler 114 specified by a request type (e.g., disk, tape, etc.) and device identification (ID) supplied in the I/O request packet. The device handler 114 builds the channel command based on the information provided in the I/O request. The built command is issued to the channel at the address provided in the I/O request.

If the I/O request is a tape request, the tape device handler 114 will build the appropriate command for the channel type that the device 104–106 is connected to. For example, a read command, write command, etc. will be built by the tape device handler 114 for the particular channel type, such as SCSI, FIBRE, etc. The tape device handler 114 passes the command to the channel by calling a particular Application Programming Interface (API) using a predetermined command. As is known in the art, an API is a series of functions that programs can use to make the operating system do certain tasks. Depending on the command, data may be read from or written to the tape devices 104, 106 to/from the user memory 102. Once control is returned to the tape device handler 114, the handler will build any additional commands specified by the I/O request packet, or return status by calling the appropriate CIO control module 112 routine to post status on the status queue 122. DMA transfers, for example, may be executed to transfer the I/O packets to the status queue 122. When status has been posted (e.g., creating a status queue entry and setting the valid flag in the entry), the tape device handler 114 returns control to the CIO control module 112.

If the I/O request is a "read from disk" request, the disk device handler 114 stages the data from disk 108–110. Alternatively, a cache memory (not shown) may also be implemented, and a read from disk request first results in a determination by the disk device handler whether the requested data is already in the cache, and if so, the data is simply formatted and transferred from the cache to the system memory. Otherwise, the disk device handler 114 stages the data from disk 108–110. The device handler 114 builds the appropriate read command (e.g., SCSI, FIBRE, etc.), and issues it by calling the appropriate API. When the data is retrieved, it is optionally formatted 124 and transferred to the user memory 102. Where a cache is employed, the data will be staged to the cache, and then formatted and transferred to the user memory 102. Status is posted to the system by way of setting a valid flag for the respective entry in the status queue 122, and control is passed back to the CIO control module 112. Again, DMA transfers may be executed to transfer the I/O packets to the status queue 122.

For write requests, the disk device handler 114 may update the cache with the data to be written, where a cache is implemented. In either case, the disk device handler 114 builds the appropriate write command and calls the API to transfer the data from the memory 102 to disk 108–110. After the data is transferred to the disk, status is posted to the host system via the status queue 122, and control is passed back to the CIO control module 112. Again, DMA transfers may be used to transfer the I/O packets to the status queue 122.

When control is passed back to the CIO control module 112, the thread again polls the initiation queue 120 for I/O requests. It should be noted that multiple threads may be used to poll and process I/O requests from the host system. In one representative embodiment, only one thread at a time will poll for I/O requests, while multiple threads may process I/O requests.

In order to test the operation of the CIO control module 112, device handlers 114, and other modules engaged in I/O transactions, prior art systems required relatively complex testing methodologies. For example, in prior art systems that did not employ a commodity I/O module as shown in FIG. 1, I/O requests from a mainframe computer to a disk or tape were conducted via a hardware I/O channel that was attached to the mainframe. The microcode for the I/O channel was developed via diagnostic tools. The software diagnostic programs were then run, and finally the Operating System (OS) was run. However, the internal operation of the OS is inherently complex. Test code was required to be part of the normal instruction stream, which made testing of the CIO module complex, as well as limited in capabilities and flexibility. The exerciser modules in accordance with the present invention provide a manner of making I/O requests directly to the commodity I/O software complex by bypassing the OS, which makes testing, debugging, performance monitoring, etc. highly manageable.

Figure 2:
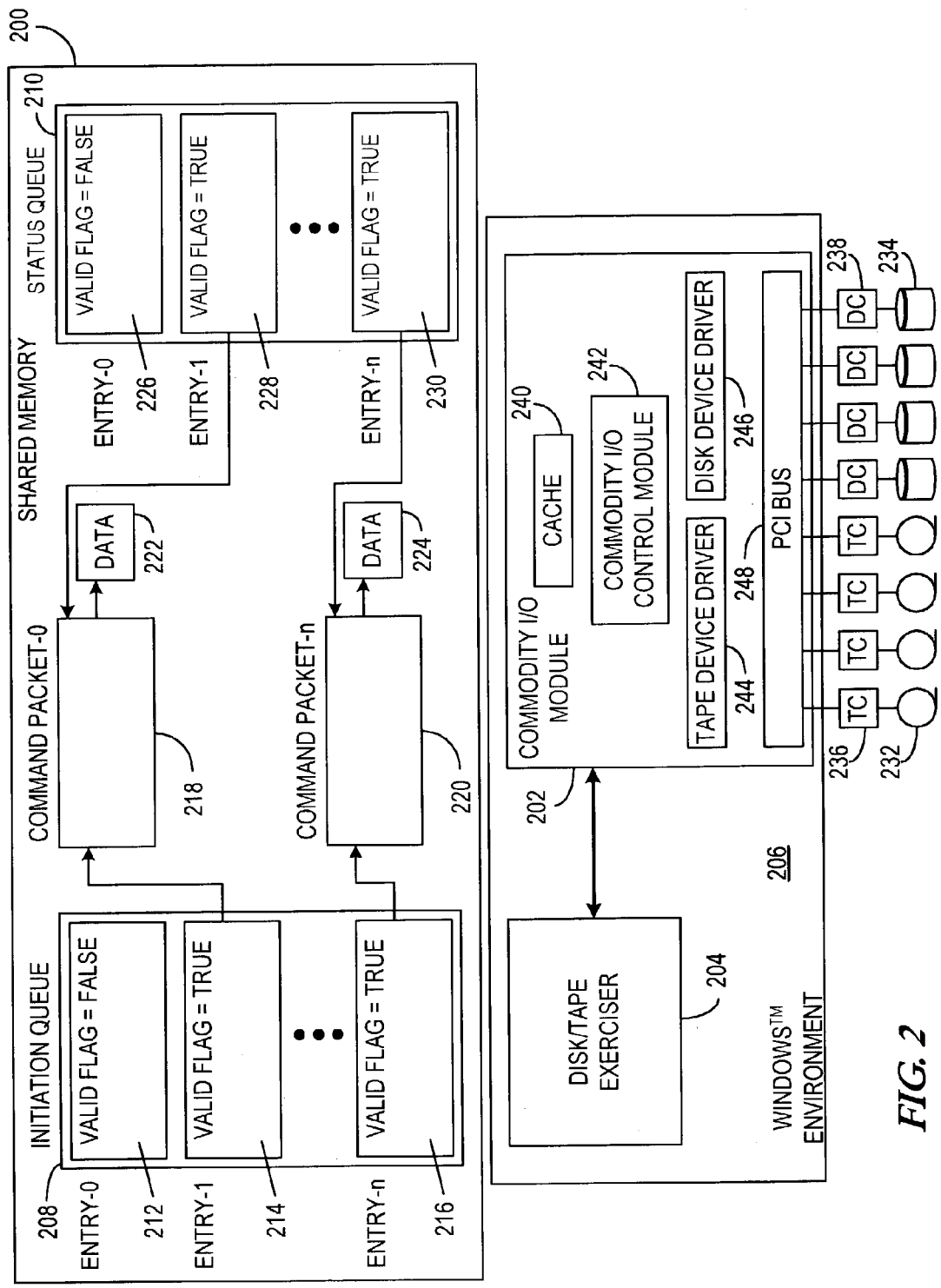
FIG. 2 is a block diagram of an exemplary commodity I/O architecture and exerciser in accordance with the present invention.

FIG. 2 is a block diagram of an exemplary commodity I/O architecture and exerciser in accordance with the present invention. In the illustrated embodiment, the exerciser and commodity I/O modules are operated via a software-based system upon which the exerciser and commodity I/O applications are run. In one embodiment, the exerciser and commodity I/O modules are operated in a WINDOWS™ (Microsoft Corporation trade name) environment. It is also noted that in one embodiment of the invention, the operating system also runs as a WINDOWS™ application program, although this need not be the case. The operating system may be run as an application on another operating system such as WINDOWS™, for example, where the WINDOWS™ (or other operating system) is to serve as an emulation environment for the legacy operating system. Thus, while the present invention is described in terms of such a WINDOWS™ environment, the present invention is applicable to other known and/or proprietary operating system environments. For example, the principles of the present invention are also applicable to known operating systems such as Linux, UNIX, etc.

The shared memory 200 in FIG. 2 is accessible to both the commodity I/O (CIO) module 202 and the exerciser 204. As will be described in further detail below, one embodiment of the invention utilizes shared memory 200 during exerciser testing, however the shared memory being referenced is not being controlled by the system operating system at this time. This is accomplished via a special setup procedure at boot time, which informs the operating system (e.g., WINDOWS™ in this example) that there is less memory than is actually available in the shared memory. The remaining memory can therefore be used in connection with the exerciser tester using a special device driver, thereby allowing the operating system to essentially be bypassed during exerciser testing.

In the illustrated embodiment, the exerciser 204 includes disk and tape exerciser modules which, together with the CIO module 202, operate in a WINDOWS™ environment 206. Thus, in one embodiment, the modules associated with the commodity I/O module 202 and the exerciser 204 are implemented with software, while the Peripheral Component Interconnect (PCI) bus 248 serves as a physical interface to the I/O components.

As described above, execution of I/O commands during normal operation involves the use of an initiation queue and a status queue. Such queues are illustrated in FIG. 2, shown as the initiation queue 208 and the status queue 210. Each entry on each queue includes certain information related to the I/O command. For example, each of the entries 212, 214, through 216 on the initiation queue 208 includes information such as a valid flag, a request identifier (ID), a pointer to the command packet, and the command packet size. Where an entry has a valid flag equal to TRUE as in entry-1 214 and entry-n 216, corresponding command packets are provided as illustrated by command packet-0 218 and command packet-n 220. The command packets include predetermined fields to store corresponding information. In the case of a command packet for a disk I/O function, the command packets include information such as a pointer to the corresponding user data, the number of words to read/write, the disk number, the starting disk address, the completion status, etc. The pointers to the user data is an address of the data (e.g., 222, 224) associated with the respective command packet 218, 220.

Similarly, entries in the status queue 210 include information such as a valid flag, a request ID, and a pointer to the command packet. For example, the illustrated status queue 210 includes an indeterminate number of entries, including entry-0 226, entry-1 228, through entry-n 230. In the illustrated embodiment, entry-1 228 and entry-n 230 have valid flags equal to TRUE, which indicates that status is available for the corresponding command packets 218, 220. In an exemplary embodiment of the invention, the valid flag for a particular request will not contemporaneously be set in both the initiation queue 208 and the status 210. For example, an asserted valid flag for an I/O request in the initiation queue 208 indicates that the I/O request is ready for processing, and therefore would not have any processing status at that time. Further, an asserted valid flag for the I/O request in the status queue 210 would generally indicate that I/O processing has completed. In this case, the valid flag would no longer be asserted for that request in the initiation queue 208, as it has already been processed. More particularly, one embodiment involves setting the initiation queue 208 valid flag by the host when the entry is ready for processing, and clearing the valid flag by the commodity I/O module when the entry is being processed. Similarly, the status queue 210 valid flag is set by the commodity I/O module when status becomes available (e.g., when processing has completed), and the valid flag is cleared by the host when the status is being returned to the user. Other embodiments are possible, particularly where multiple flags are used. For example, the status queue 210 may have multiple status flags, such as a "processing" flag indicating that the request is currently being processed, as well as the valid flag indicating completion of the processing. However, in the illustrated embodiment of FIG. 2, the valid flag will not be set to TRUE in both the initiation queue 208 and the status queue 210 at the same time for a particular request, and thus the example of FIG. 2 does not reflect the temporal characteristics associated with the state of the valid flags in the initiation queue 208 and status queue 210.

The initiation and status queues 208, 210 are used in connection with the commodity I/O module 202 to manage the I/O transactions to the various I/O components. In the illustrated embodiment, the I/O components include tape units 232 and disk units 234, each of which is controlled by a corresponding tape controller (TC) 236 or disk controller (DC) 238.

The exemplary commodity I/O module 202 includes a cache 240, which in one embodiment is a software construct serving as a store-through cache for hard disk operations involving disk units 234. The cache 240 is said to be store-through since each write request from the OS results in data being transferred from user memory to cache 240, and then to one or more of the disk units 234 before the write request is accorded a status of complete. Cache 240 may be used to enhance the operation of the I/O computing system in a number of ways. The speed of operation of the logical I/O interface is enhanced, since memory operations with high-speed cache memory reduces the amount of time required for read/write operations. In addition, read-before-write problems commonly associated with hard disk arrays are solved when using a single interface to the array of disk units 234. The cache 240 may be implemented as a single interface to the disk units 234, so that read and write operations with the disk units 234 do not occur concurrently. Additionally, cache 240 may be used to provide a translation interface between data block sizes associated with tape and disk units 232, 234 and the data block sizes associated with the operating system. A data block translation may be required, for example, when partial record updates are required to one or more disk units 234.

The CIO control module 242, and device drivers 244, 246 operate as described for the CIO control module 112 and device handlers 114 set forth in FIG. 1. Via the PCI bus 248, the device drivers 244, 246 can communicate with the tape controllers 236 and disk controllers 238 to carry out the desired I/O functions.

The present invention involves the exerciser 204, which in the illustrated embodiment includes both disk and tape exercisers. In one embodiment of the invention, the exerciser is a WINDOWS™ application program that sends I/O commands (e.g., read, write) to another program module, namely the commodity I/O module 202. The exerciser 204 provides an easy, controlled method of providing read, write, or other I/O requests to the commodity I/O module 202 to facilitate debugging of the commodity I/O software mechanism. Furthermore, the exerciser provides for data verification and performance testing and tuning. From the commodity I/O viewpoint, the exerciser appears as would the operating system that otherwise manages normal processing of I/O requests. Just as the OS initiates a read or write request to disk or tape units by placing an item into the initiation queue 208 (which in turn points to corresponding command packets 218, 220 that contain details about the I/O request), the exerciser generates I/O requests for the commodity I/O module 202.

Under normal operating conditions, the OS generates I/O requests to accomplish specific tasks. For example, the OS first issues read commands to a disk to "bootstrap" itself and get the other portions of the OS loaded into memory. After the OS is operational, user applications are run, under control of the OS, to accomplish the specific tasks of the applications. These user applications issue read and write commands to the tapes and disks. The exerciser 204 essentially bypasses the OS, and generates I/O requests in a very controlled manner. The amount of data to read or write, the specific I/O command, a tape or disk identifier, and the target location on a disk are among the information that can be specified and sent to the commodity I/O module 202 via the exerciser 204. The commodity I/O performs the desired operation(s) and returns status to the exerciser 204 for verification. The exerciser can then easily perform data verification to determine whether the commodity I/O module 202 performed as expected.

Another purpose of the exerciser 204 is performance testing and tuning of the commodity I/O module 202. Although the full OS environment may still be used for some testing applications (referred to as "benchmarks"), it is highly advantageous to perform some performance measurements in a closely-controlled environment. In one embodiment, the exerciser uses tightly controlled timers to make accurate measurements of the length of time the commodity I/O module takes to perform various I/O commands. If necessary, the commodity I/O module 202 can be modified and the exerciser test re-run to determine the differences in performance. This saves a great deal of time in software development.

The exerciser tester 204 in accordance with the present invention may be used with various types of I/O components. In accordance with one embodiment of the invention, at least a portion of the exerciser tester software for each of the I/O components may differ. For example, two versions of the exerciser may be used for disks and tapes. Therefore, while much of the setup and control structures may be common to both disk and tape exerciser tests, more customized portions of the exerciser may be used for the particular operations unique to disks, tapes, etc.

The embodiment of FIG. 2 includes the exerciser 204, operating system 206, and CIO module 202 within a common platform. In this embodiment, WINDOWS™ controls the emulated system and the exerciser 204. Certain memory, such as the reserved area for the initiation queue 208 and the status queue 210, is partitioned such that it is essentially "off limits" to the WINDOWS™ (or other) operating system during exerciser testing.

Another use of such an exerciser 204 is to test the environment to be used in new systems, which may not operate in an environment common to the exerciser. In such a case, the CIO module 202 and associated memory may be provided separately, and the exerciser may be used independent of the operating system of the CIO module 202. For example, the CIO module 202 may be provided as a separate module that can include its own memory and processor that runs a separate operating system. Such a module can be connected to the main system, such as the emulated system described in connection with FIG. 1. In one embodiment, such a connection may be realized using, for example, a PCI Bus Extender known in the art. Additional operations may be required to access the initiation queue and status queue from the separate CIO module, such as using Direct Memory Access (DMA) instructions to access information across the bus extender. Data may also be transferred across the extender in a different manner. From the exerciser's point of view, functional operation is otherwise analogous to that described in connection with FIG. 2. To test the new, separate CIO module running its own operating system (e.g., VXWORKS, LINUX, etc.), the exerciser may be run using its operating system (e.g., WINDOWS). The exerciser can then be connected to the CIO module via the PCI Bus Extender or other connection technique. Thus, the principles of the present invention are applicable where the exerciser tester is operating on a common platform with the CIO module, or where the exerciser tester is operating independent from the CIO module and its operating system.

Figure 3:
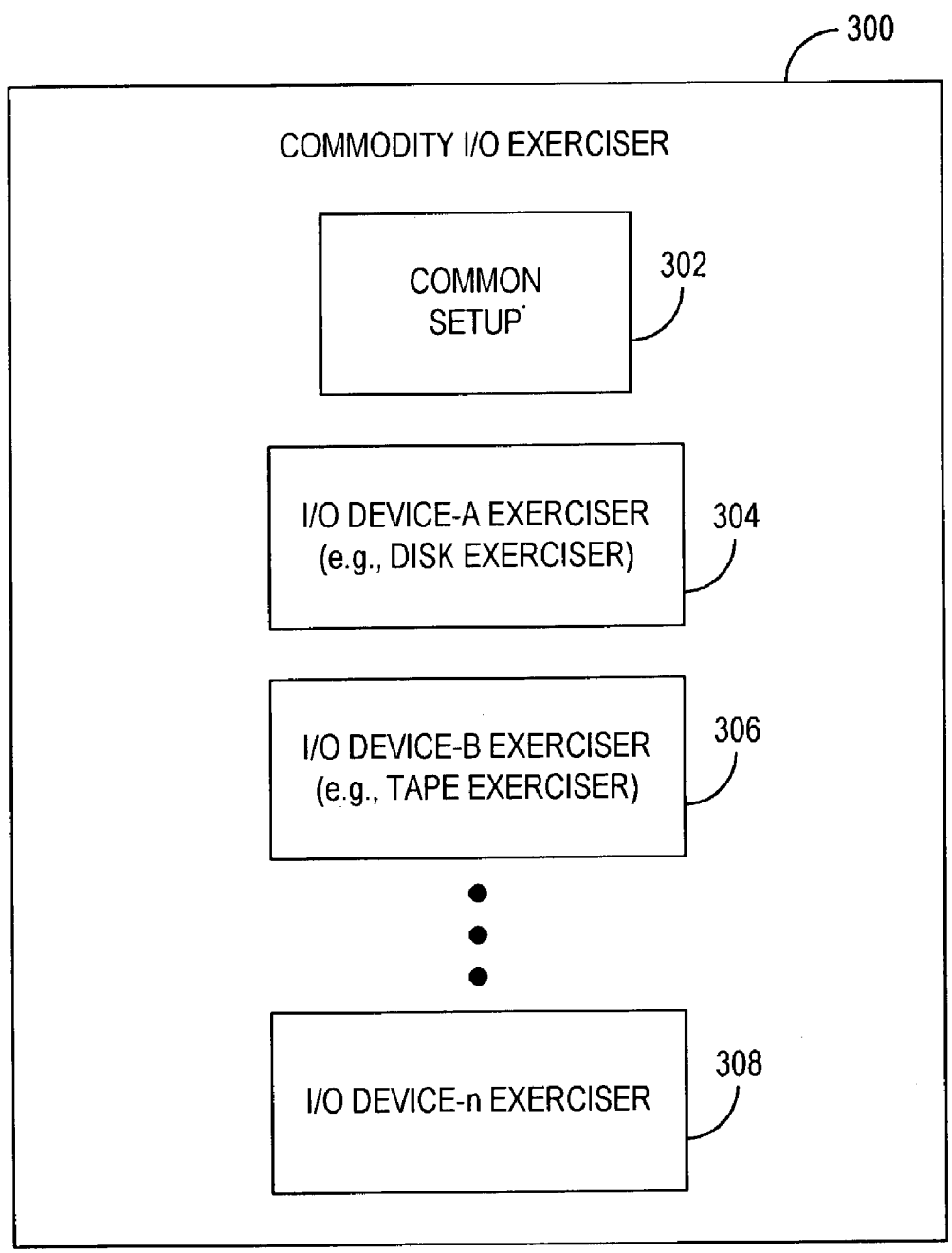
FIG. 3 is a block diagram of a commodity I/O (CIO) exerciser in accordance with one embodiment of the invention.

FIG. 3 is a block diagram of a commodity I/O (CIO) exerciser 300 in accordance with one embodiment of the invention. The CIO exerciser 300 includes a common setup portion 302 which includes one or more programs to initialize the commodity I/O module. This initialization may be common to a plurality, or all, of the various exerciser tests to be conducted. A more particular example of a common setup routine 302 will be described in greater detail in connection with FIG. 4.

As shown in FIG. 3, one or more I/O device exerciser programs may be associated with the CIO exerciser 300. In the illustrated embodiment, a plurality of I/O device exercisers are shown, including I/O device-A exerciser 304, I/O device-B exerciser 306, through I/O device-n exerciser 308. For purposes of illustration, the I/O device-A exerciser 304 represents a disk exerciser, while the I/O device-B exerciser 306 represents a tape exerciser. Any number of desired exerciser routines corresponding to the I/O components to be tested may be employed. Each of the specific exerciser routines 304, 306, 308 may be associated with a different test "script," an example of which is later described in connection with FIG. 5.

Figure 4A:
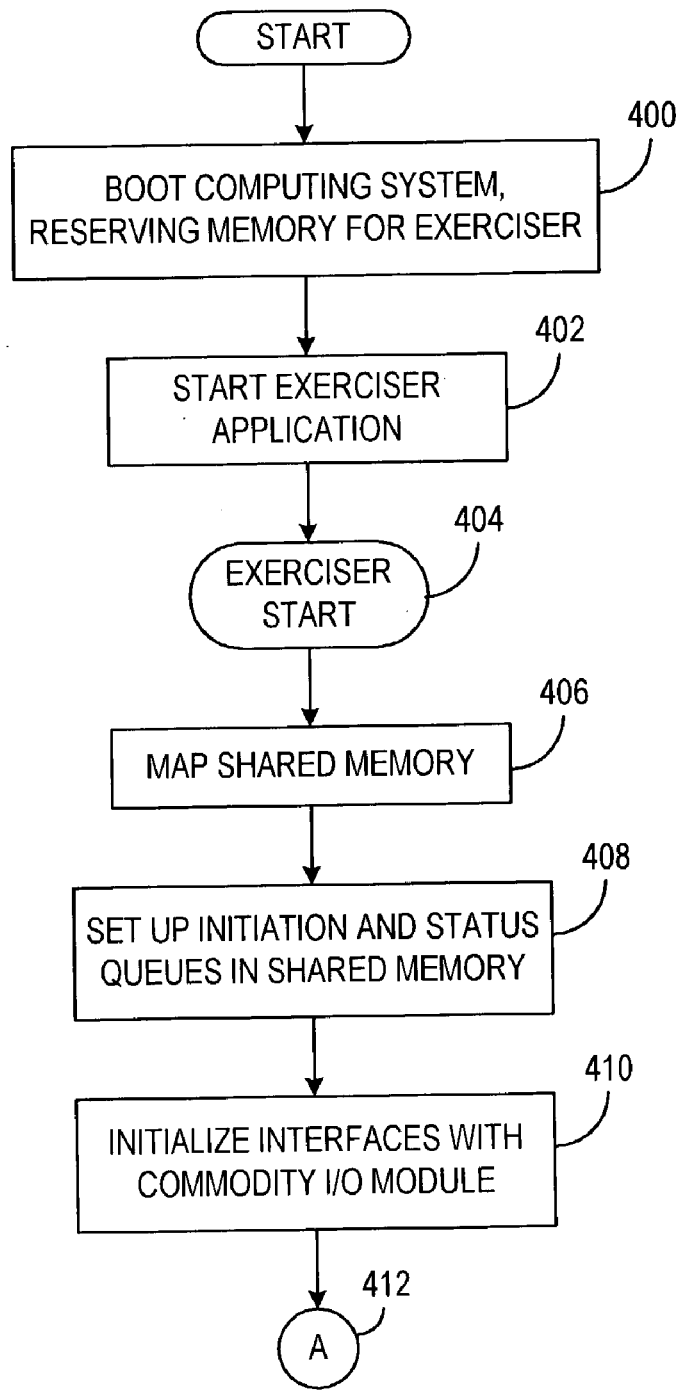
FIGS. 4A and 4B, illustrates an exemplary embodiment of a process for performing one or more exerciser tests.
Figure 4B:
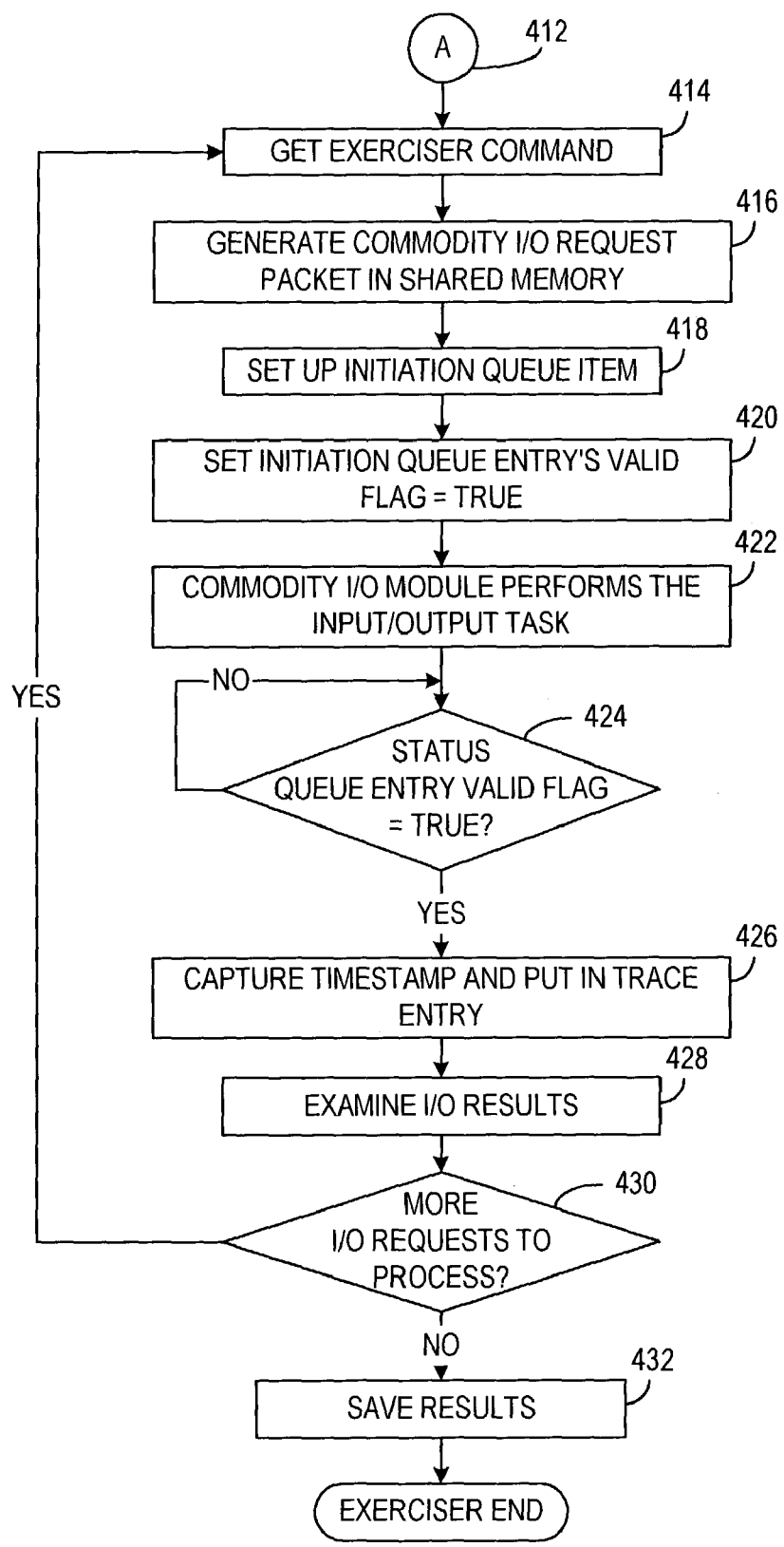

FIG. 4, including FIGS. 4A and 4B, illustrates an exemplary embodiment of a process for performing one or more exerciser tests. While specific exerciser tests for different I/O components (e.g., disk units, tape units, etc.) may differ in the way that they generate new commands to be sent to the commodity I/O module and the types of command sequences that are sent, much of the setup and control structures may be common to each. FIG. 4 represents a general flowchart of one embodiment of the setup and control structures that are common to the exerciser tests for the various exerciser tests.

The process starts upon initiation of the computing system which is to perform the exerciser tests. For example, the computing system is first booted as shown at block 400. The exerciser application is initiated 402 which allows the exerciser to start 404. When the computing system is booted, the operator can specify an option which allows the operator to in effect "hide" part of the computer system's memory from the operating environment. Then, when the exerciser application starts, it is able to take advantage of this extra memory via a special software mechanism referred to as a device driver. This memory is then available to both the exerciser and the commodity I/O module. This process of reserving or "mapping" this portion of the memory is shown at block 406.

The exerciser starts initializing the commodity I/O module by sending commands via predefined shared memory locations. Then, as the initialization process continues, additional software structures and locations are established for full I/O operation. For example, the locations of the initiation and status queues in the shared memory are established, as shown at block 408. Initiation and status queues are used just as the initiation and status queues are used during normal operation, however the initiation and status queues are created in the exerciser address range during exerciser testing. Therefore, while normal operation involves initializing the initiation and status queues in the system memory, analogous initiation and status queues are set up in the exerciser address range for purposes of exerciser testing in accordance with the invention. Therefore, the commodity I/O module that operates on the initiation and status queues during normal operation will be initialized to look for the initiation and status queues in the exerciser address range during exerciser testing. From the exerciser's point of view, these initiation and status queues will appear just as the initiation and status queues would appear during normal operation, with the exception that the address locations are different than the addresses of the actual initiation and status queues that will be used during normal operation. In this manner, I/O requests can be directly entered onto the initiation queue by the exerciser, and retrieved from the status queue by the exerciser, while bypassing the operating system which would otherwise be required to manage such operations on the initiation and status queues. This allows for more direct and manageable testing of the commodity I/O module due to the ability to directly manipulate and retrieve data on the exerciser initiation and status queues.

After the exerciser and commodity I/O structures are initialized, the exerciser provides a command to the commodity I/O module to start looking for I/O requests via the initiation queue mechanism, as shown at block 410 where the interfaces with the commodity I/O module are initialized. At this point, the exerciser appears to be exactly like an OS from the commodity I/O point of view, and the exerciser can send I/O requests to the commodity I/O attached devices via the initiation queue, as described more fully below.

When the initiation/status queues and the commodity I/O interfaces have been initialized, the general method continues from FIG. 4A to FIG. 4B as shown via link "A" 412. At this point, the exerciser can access a command from the particular test script, as shown at block 414. A commodity I/O request packet is generated 416 in the shared memory, and an entry corresponding to that packet is set up 418 in the initiation queue. The initiation queue entry for this I/O request is modified such that its "valid flag" is set to TRUE, as shown at block 420. Setting the valid flag to TRUE (or other predetermined designator/logic state) indicates that the entry is available for I/O processing. The commodity I/O module, recognizing the available entry on the initiation queue just as if the OS had placed an I/O request on the queue, processes the request to allow the targeted I/O component to perform the requested I/O task as shown at block 422. If the "valid flag" is set to TRUE (or other predetermined designator/logic state) on the status queue entry as determined at decision block 424, then the I/O component has completed the task. If the valid flag is not set to TRUE on the status queue entry, the commodity I/O module waits for completion of the task as represented by the wait loop associated with block 424.

When the I/O component has completed the task, and the status queue entry's valid flag has been set to TRUE as determined at decision block 424, other statistical information can be captured. For example, a timestamp can be captured 426 and temporarily or permanently stored. In one embodiment of the invention, timestamps may be captured and entered as trace entries in a trace entry buffer. Different trace entries (i.e., timestamps) from the trace buffer can then be compared or otherwise processed to determine I/O existence times between the selected trace entries.

The I/O results, including the status and data, are then examined 428 by the exerciser. If more I/O requests are to be processed as determined at decision block 430, the exerciser obtains another exerciser command at block 414. For example, if additional I/O requests are present in the exerciser test script, the exerciser will obtain the next I/O request from the script. If the script is complete such that there are no further I/O requests to process as determined at decision block 430, the results may be saved 432 (e.g., stored to memory, hard drive, disk, CD-ROM, etc.), and the exerciser test ends. As described above, many of these operations associated with FIG. 4 are exerciser operations that are common to each of the more particular exerciser tests.

The flow diagram of FIG. 4 illustrates one embodiment of a general exerciser testing procedure. More particular exerciser tests that deviate to some degree from the more general procedure may be implemented. Deviations from the general exerciser procedure may be based on the particular I/O component associated with the testing. For example, the exerciser procedures may include disk and tape exercisers, each of which may follow the general exerciser procedures, yet differ from one another based on the manner in which they generate new commands to be sent to the commodity I/O module, and on the different kinds of command sequences sent. Therefore, different "scripts" may be used for the different types of exercisers.

A disk exerciser is one type of exerciser in accordance with the present invention. The disk exerciser is driven by a test script that includes certain information to define each test activity to be accomplished. In one embodiment, the disk exerciser is driven by a text file script that is prepared by the exerciser operator. Each line of the text file may represent an I/O request to be issued. Each line specifies a number of parameters, such as the type of operation, the disk identification (ID), the starting disk address, and the size of the I/O. It should be recognized that the present invention is equally applicable to other test scripts other than a text file script. For example, the test script can be presented in other text formats, as well as code, graphics, or other formats from which the individual test activities can be derived.

In one embodiment of the invention, the specified operations associated with an exemplary disk exerciser includes "write" operations, "read" operations, "read and verify" operations, and "write, read, verify" operations. FIG. 5 is represents an exemplary text file script 500 for a disk exerciser in accordance with the present invention. The exemplary text file script of FIG. 5 includes a number of test activities, each represented in FIG. 5 by a row of text in the illustrated embodiment, although the particular layout of the text in the script is not relevant to the invention. More particularly, each I/O request to be performed in connection with the exerciser includes a type of operation 502, the disk ID 504, the starting disk address 506, and the size 508 of the I/O activity to be performed.

A first type of operation shown in the text file script 500 is a "write" 510 operation. For a "write" command 510, the commodity I/O module writes the number of words specified by its size 508 (FF) to the disk specified by the disk ID 504 (DISK-A) starting at the specified starting disk address 506 (FFFF 0000). For a "read" command 512, the commodity I/O module reads the number of words specified by its size 508 (FF) from the disk specified by the disk ID 504 (DISK-A) starting at the specified starting disk address 506 (FFFF 0000).

For a "read and verify" command 514, the commodity I/O module first reads the number of words specified by its size 508 (FFF) from the disk specified by the disk ID 504 (DISK-B) starting at the specified starting disk address 506 (FFFF 1000). Then, the commodity I/O module compares the data read to a known "output" buffer which was presumably written in a previous operation. This will verify that what was previously written corresponds to that which was presently read back.

For a "write, read, verify" command 516, the commodity I/O module first writes the number of words specified by its size 508 (FFFF) to the disk specified by the disk ID 504 (DISK-D) starting at the specified starting disk address 506 (8000 0000). Then the commodity I/O module reads the number of words specified by its size 508 (FFFF) from the disk specified by the disk ID 504 (DISK-D) starting at the specified starting disk address 506 (8000 0000). Finally, the commodity I/O manager performs a byte-by-byte comparison of the data that was first written to the data that was subsequently read back.

The types of I/O commands described in connection with FIG. 5 (e.g., "write," "read," "read and verify," and "write, read, verify") are representative commands that may be used to test a disk I/O component. It should be recognized that these specific commands are representative of the types of commands that may be used in connection with a disk exerciser. However, other types of commands may also be used, and therefore the present invention is not limited to the exemplary I/O commands described in connection with FIG. 5.

It is also noted that test scripts are not required for use in connection with the present invention. I/O request packets may alternatively be directly generated which direct the I/O system to perform certain types of commands. Thus, such hard-coded exerciser methods, as well as test scripts, may be used in accordance with the present invention. For example, in one embodiment of a tape exerciser, no test scripts are used. Rather, the tape exerciser directly generates commodity I/O request packets, which command the commodity I/O to perform either data transfer type commands or non-data transfer type commands.

Figure 6:
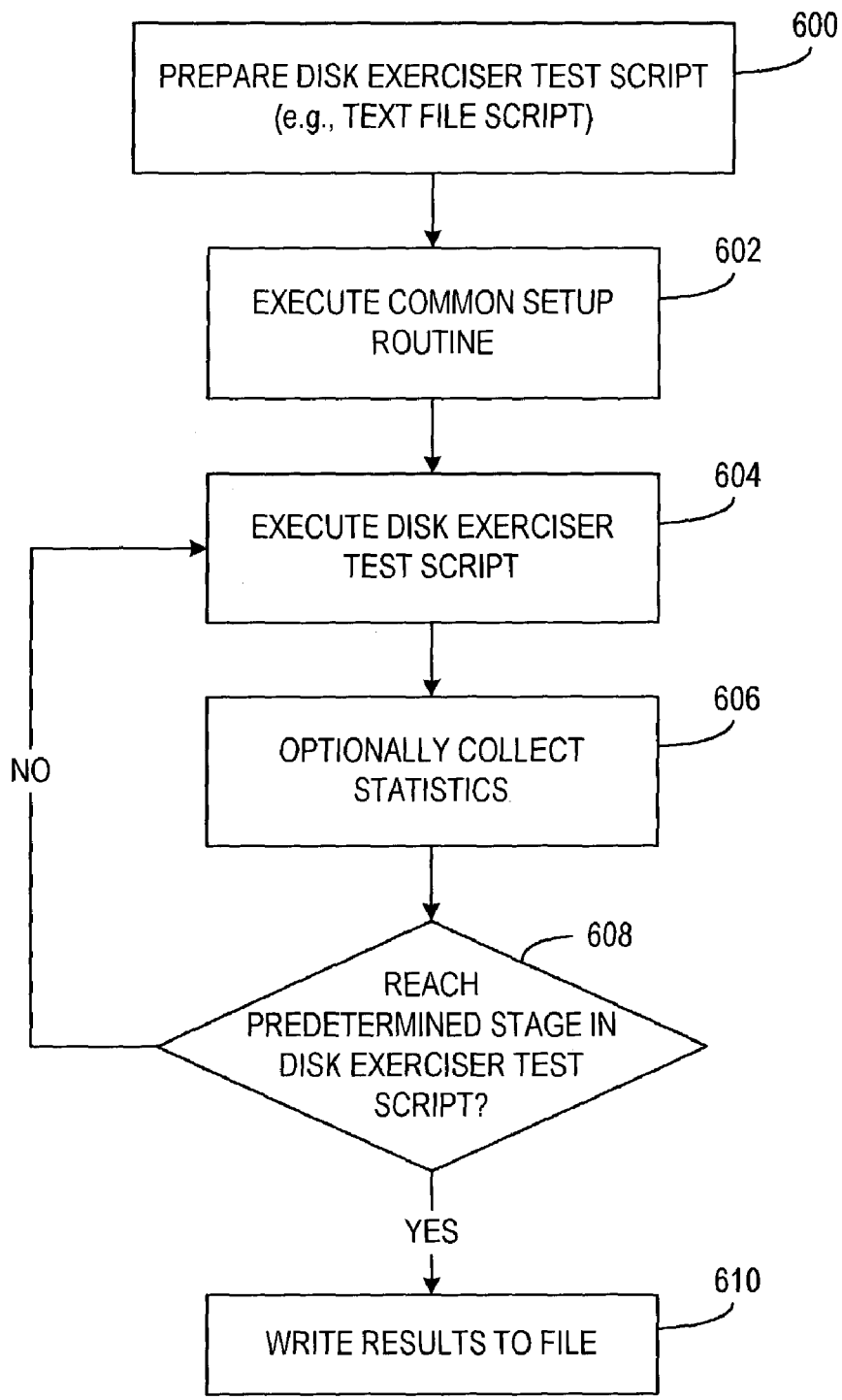
FIG. 6 is a flow diagram illustrating one embodiment of a method for carrying out a disk exerciser test in accordance with the present invention.

FIG. 6 is a flow diagram illustrating one embodiment of a method for carrying out a disk exerciser test in accordance with the present invention. A disk exerciser test script is first prepared 600. The test script can be generated manually by, for example, the exerciser operator or programmer. Alternatively, the test script can be at least in part generated by a computing program that outputs some or all of the test script. In one embodiment of the invention, the test script is a text file script including lines of text code which is recognizable by the exerciser. Other script formats are equally applicable to the present invention.

The disk exerciser may include a portion of code that is common to other disk exercisers. For example, at least a portion of an exerciser test script may be equally applicable to other commodity I/O unit tests, such as a tape unit. In this case, the common setup routine may be accessible by each of the various exercisers (e.g., disk exerciser, tape exerciser, etc.). One exemplary manner of accessing this common routine(s) is to include a jump, branch, etc. instruction in each of the individual exerciser scripts to access the common portions of the individual exerciser tests. Alternatively, any common setup or other common portions of the exerciser scripts may be duplicated in each of the particular exercisers such that, for example, both the disk and tape exercisers include the common portions as part of the particular exerciser test script. Regardless of the particular implementation, the common setup routine(s) is executed 602. It should also be recognized that some embodiments of the invention may have no common portions, such that no common setup routine is executed.

In addition to executing 602 any common setup routine, a disk exerciser test script is executed 604. In one embodiment, execution of the disk exerciser test script generally tracks the general method described in connection with FIG. 4, although the disk exerciser method may deviate from this general method depending on the disk device to be tested, the requisite tests to be performed, whether portions of the general method have already been performed (e.g., mapping the shared memory), or the like. In any event, the disk exerciser is executed 604 based on a test script, such as the exemplary text file script described in connection with FIG. 5. For example, in one embodiment of the invention, exerciser commands in the text file script are retrieved by the exerciser, which in turn generates commodity I/O request packets, sends the packets to the initiation queue, marks the corresponding initiation queue entry as ready for processing (e.g., setting the entry's valid flag=TRUE), waits for the commodity I/O module and targeted disk unit to carry out the I/O task, monitors the status queue for completion of the I/O task, and stores the I/O results for manual or automated examination.

Figure 7:
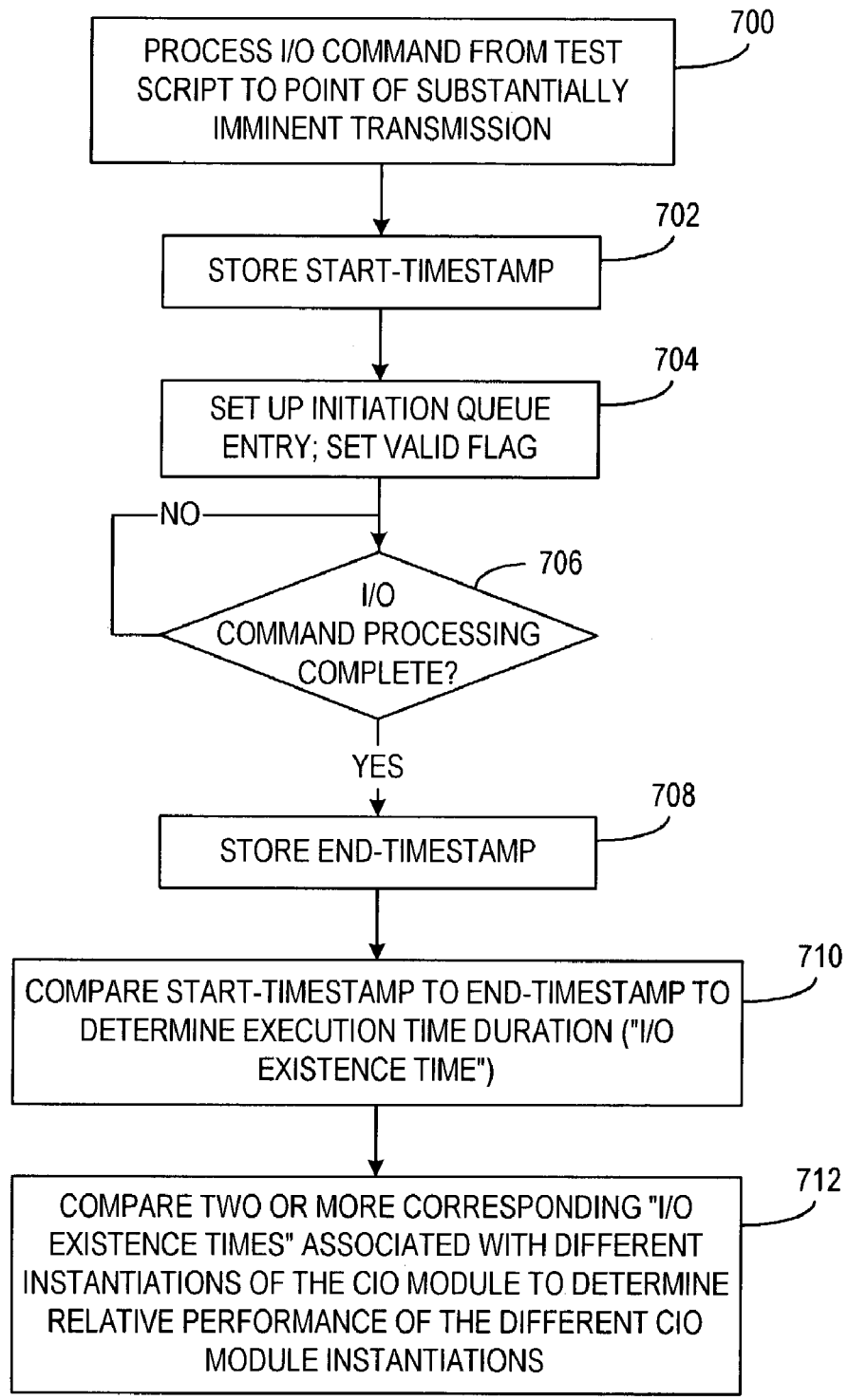
FIG. 7 is a flow diagram illustrating an exemplary embodiment of a method for collecting statistics using the exerciser in accordance with the present invention.

Statistics associated with the I/O tasks being executed pursuant to the test script are optionally collected 606. Referring to FIG. 7, one example of such statistics collection is illustrated. In the example of FIG. 7, the exerciser stores a timestamp 702 that is generated substantially contemporaneously to the I/O transmission to the commodity I/O module (e.g., just prior to the valid flag being set to TRUE in the initiation queue entry). In other words, the I/O command from the test script is processed to the point of substantially imminent transmission to the commodity I/O module, as shown at block 700. The "start-timestamp" is then stored 702, such as by temporarily storing the start-timestamp on storage media, or in a memory location, processor register, trace entry buffer, etc. The initiation queue entry is set up and the valid flag is set, as shown at block 704, which facilitates initiation of I/O command processing as previously described. When the I/O command processing has completed as determined at decision block 706, the exerciser will store 708 another timestamp (an "end-timestamp"), when processing of the I/O command has completed.

The start-timestamp is then compared 710 to the end-timestamp to determine the execution time duration, such as by determining the difference between the two stored timestamps. This time differential is referred to herein as the "I/O existence time." Collecting I/O existence time statistics allows for subsequent comparison 712 of multiple I/O existence times associated with different instantiations of the commodity I/O module, which allows the relative performance of the different commodity I/O module instantiations to be ascertained. Therefore, performance statistics between exerciser runs can be compared, to determine how the I/O existence times change in response to development changes made to the commodity I/O module. The performance of the commodity I/O module can therefore be optimized.

The collection of I/O existence times illustrates one type of statistic that may be collected by the exerciser. It should be recognized, however, that any number of different desired statistics may be collected and subsequently analyzed to assist with debugging or otherwise enhancing performance of the commodity I/O module to ready the commodity I/O module for normal operation.

Returning now to FIG. 6, after statistics are optionally collected 606, it is determined 608 whether a predetermined stage in the disk exerciser test script has been reached. An example of such a predetermined stage is the end of the test script. However, any particular stage(s) in the test script may be set as a temporary or permanent end to test script processing, such as a break point, step or trace operation, etc. associated with one or more test script operations. When such stage is reached as determined at decision block 608, the results may be written 610 to memory, or to a file or other storage structure. If the predetermined stage in the test script has not been reached, the disk exerciser test script will continue to be executed 604 until it is determined 608 that the predetermined stage has been reached.

It should be noted that the principles described in connection with the disk exerciser embodiments of FIGS. 5–7 may be equally applied to other currently known or future storage structures based on addressable storage. For example, commodity I/O units that employ media having addressable storage include hard disks, floppy disks, CD-ROM, DVD, tape, semiconductor memories, or other media accessed via I/O processing. Therefore, while the description corresponding to FIGS. 5–7 is described in terms of a "disk" exerciser, it should be recognized that this is not limited to any particular type of "disk," but rather includes any I/O component and associated storage media accessible via the system's input/output mechanisms.

Figure 8:
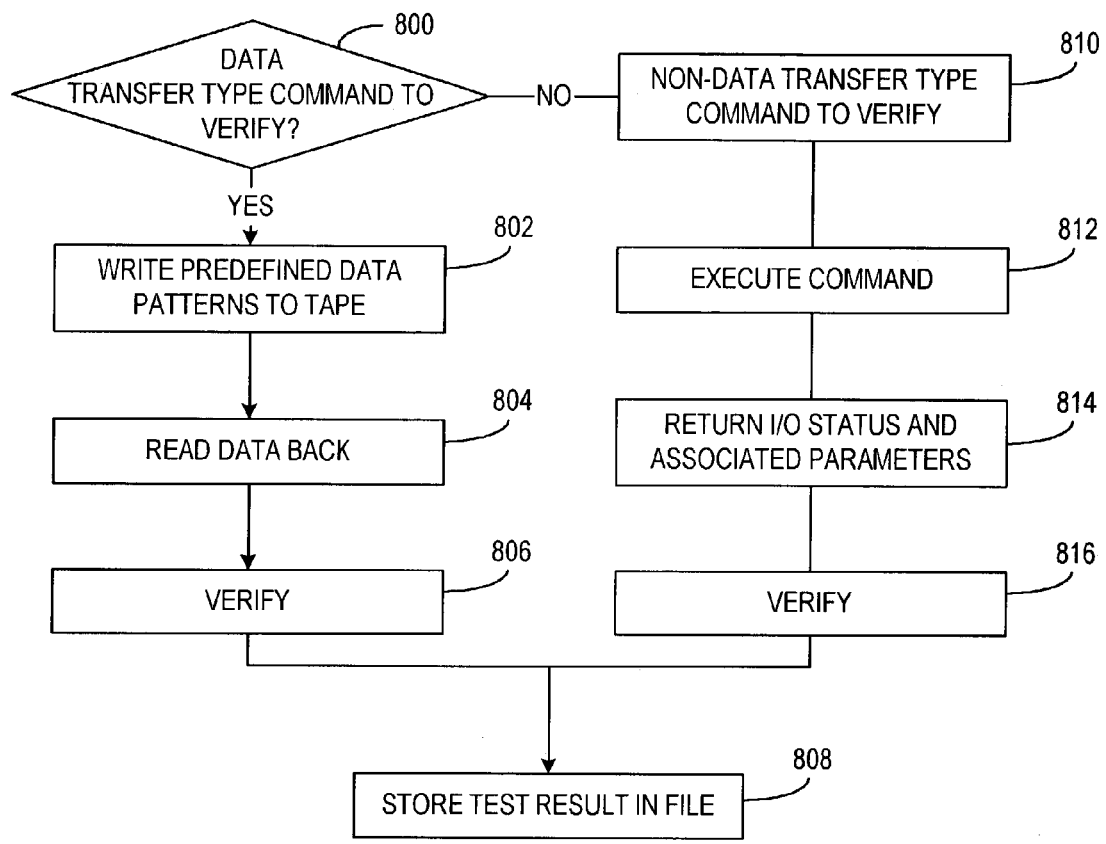
FIG. 8 is a flow diagram illustrating an exemplary tape exerciser methodology in accordance with the present invention.

As another example, a tape exerciser is considered in the example of FIG. 8. FIG. 8 is a flow diagram illustrating an exemplary tape exerciser methodology in accordance with the present invention. A particularly beneficial purpose of a tape exerciser is to verify that all of the tape storage class major and minor commands that are supported by the commodity I/O module are working properly without having to employ the Operating System. In this context, a "major" command is a command that is translated by the device driver (see, e.g., 244, 246 of FIG. 1) to a device-specific command that is sent to the device across the channel interface. In some instances, the translated command can perform a set of different "operations." In such a case, the operating system specifies a desired operation via a "minor" command, which may be sent to the device as a parameter of the translated command.

The test script commands for the exemplary tape exerciser described in FIG. 8 include data transfer type commands, and non-data transfer type commands. If the command to verify is a data transfer type as determined at decision block 800, then the tape exerciser uses a predefined set of data patterns that are first written 802 to the tape. In one embodiment of a tape exerciser according to the invention, the data patterns are written 802 to the designated tape unit until the end of the tape is encountered. The tape exerciser then reads back the data as shown at block 804, and verifies 806 that the data read back is accurate. The test result is stored 808, for example, in a designated file that indicates whether the test case(s) passed or failed. If failed, both the location and the reason for the failure may be provided in the file to aid in debugging of the problem encountered.

If the command to verify is not a data transfer type as determined at decision block 800, then the command to verify is a "non-data" transfer type as shown at block 810. The command is executed 812, and the I/O status along with returned associated parameters are returned 814, and verified 816 as required by the command. The exerciser also checks to ensure that the I/O status returned from the commodity I/O module is as expected. The test result is stored 808, for example, in a designated file that indicates whether the test case(s) passed or failed. If failed, both the location and the reason for the failure may be provided in the file to aid in debugging of the problem encountered.

Figure 9:
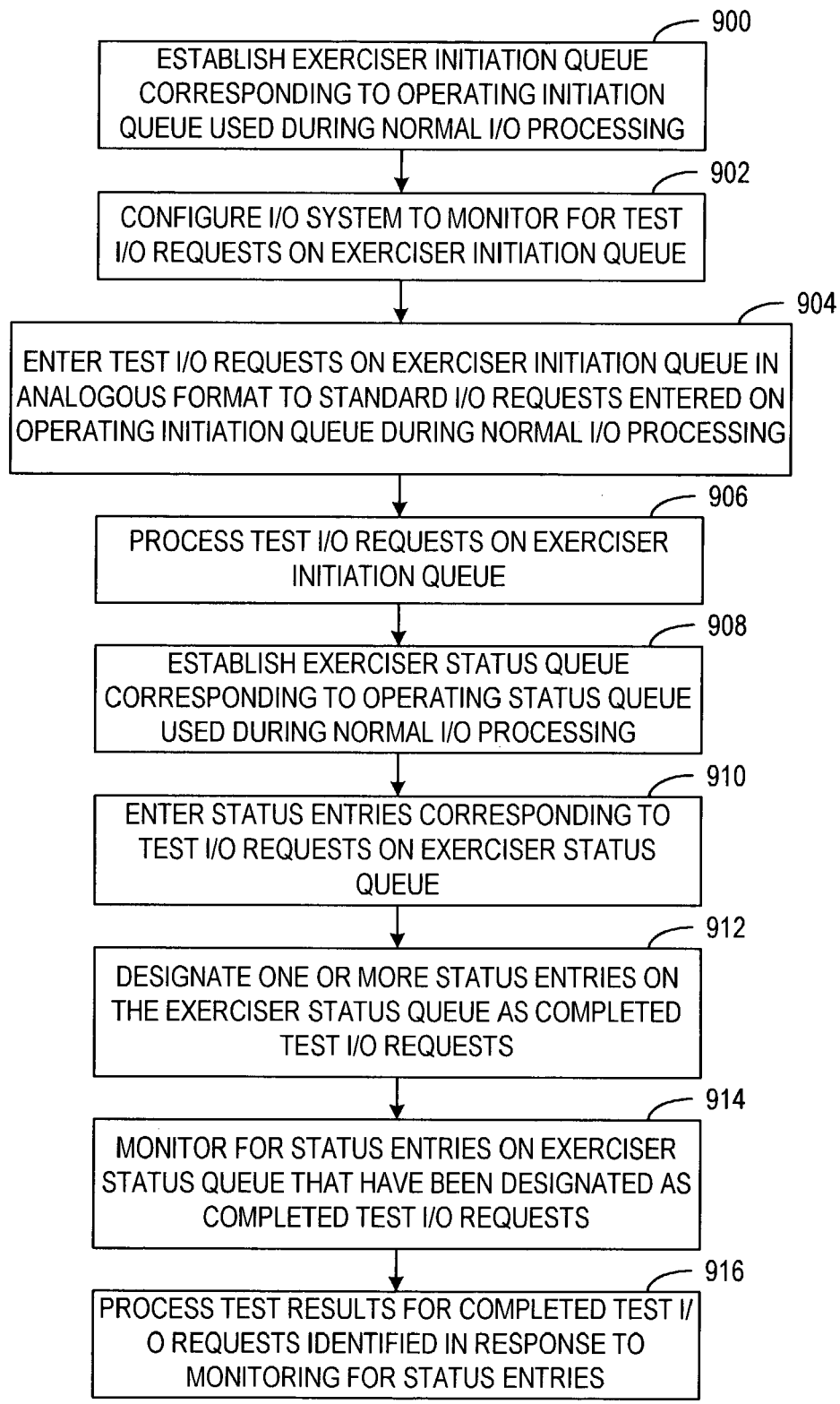
FIG. 9 is a flow diagram illustrating a representative embodiment of a method for testing an I/O system in accordance with the present invention.

FIG. 9 is a flow diagram illustrating a representative embodiment of a method for testing an I/O system in accordance with the present invention. In this embodiment, an exerciser initiation queue is established 900, where the exerciser initiation queue corresponds to an operating initiation queue used by the processing system during normal I/O processing. The I/O system is configured 902 to monitor for test I/O requests on the exerciser initiation queue in lieu of monitoring for standard I/O requests on the operating initiation queue. The test I/O requests are entered 904 onto the exerciser initiation queue in a format corresponding to the format in which the standard I/O requests are entered on the operating initiation queue during normal I/O processing. The test I/O results on the exerciser initiation queue are then processed 906 by the I/O system. For example, in the case of a disk exerciser, test results resulting from processing by the I/O system and one or more disk devices will be processed.

An exerciser status queue may also be established 908. Such an exerciser status queue may be established such that it corresponds to the operating status queue used by the processing system during normal I/O processing. Status entries, which correspond to test I/O requests, are entered 910 on the exerciser status queue. One or more status entries on the exerciser status queue are designated 912 as completed test I/O requests, which are monitored 914 for completion. Test results are processed 916 for completed test I/O requests identified in response to monitoring for the status entries.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for testing an input/output (I/O) system that facilitates I/O operations between a processing system having an operating system (OS) and one or more I/O components during normal I/O processing, the method comprising:
    establishing an exerciser initiation queue corresponding to an operating initiation queue used by the processing system during normal I/O processing;
    configuring the I/O system to monitor for test I/O requests on the exerciser initiation queue in lieu of monitoring for standard I/O requests on the operating initiation queue;
    entering the test I/O requests onto the exerciser initiation queue in a format corresponding to the format in which the standard I/O requests are entered on the operating initiation queue during normal I/O processing;
    processing the test I/O requests on the exerciser initiation queue via the I/O system.

2. The method of claim 1, further comprising:
    establishing an exerciser status queue corresponding to an operating status queue used by the processing system during normal I/O processing;
    entering status entries corresponding to the test I/O requests on the exerciser status queue;
    designating one or more status entries on the exerciser status queue as completed test I/O requests;
    monitoring for status entries on the exerciser status queue that have been designated as completed test I/O requests; and
    processing test results for the completed test I/O requests identified in response to the monitoring for status entries designated as completed test I/O requests.

3. The method of claim 2, wherein monitoring for status entries on the exerciser status queue comprises monitoring for a state of a status valid flag associated with each of the status entries on the exerciser status queue, and wherein processing test results comprises processing the test results for status entries having the status valid flag in a predetermined state.

4. The method of claim 3, wherein monitoring for status entries on the exerciser status queue further comprises monitoring, by the operating system, for status entries having the status valid flag in the predetermined state.

5. The method of claim 1, further comprising mapping shared memory to hide a predetermined memory segment from the operating system, wherein establishing an exerciser initiation queue comprises establishing the exerciser initiation queue in the predetermined memory segment.

6. The method of claim 5, wherein configuring the I/O system to monitor for test I/O requests on the exerciser initiation queue comprises configuring the I/O system to monitor for test I/O requests on the exerciser initiation queue established in the predetermined memory segment.

7. The method of claim 5, wherein entering the test I/O requests onto the exerciser initiation queue comprises entering the test I/O requests onto the exerciser initiation queue in the predetermined memory segment utilizing a device driver configured to direct the test I/O requests onto the exerciser initiation queue.

8. The method of claim 1, wherein entering test I/O requests onto the exerciser initiation queue comprises transferring the test I/O requests from a test computing system to the exerciser initiation queue.

9. The method of claim 8, wherein transferring the test I/O requests from the test computing system comprises transferring the test I/O commands from a test script including one or more of the test I/O requests.

10. The method of claim 1, further comprising monitoring for entry of the test I/O requests on the exerciser initiation queue, and wherein processing the test I/O requests comprises processing the test I/O requests entered on the exerciser initiation queue.

11. The method of claim 1, further comprising monitoring for entry of the test I/O requests by monitoring a state of a valid flag associated with each of the I/O requests on the exerciser initiation queue, and wherein processing the test I/O requests comprises processing the test I/O requests associated with a predetermined state of the valid flag.

12. The method of claim 1, further comprising setting the state of the valid flag to the predetermined state when the corresponding test I/O request is available for processing on the exerciser initiation queue.

13. The method of claim 12, further comprising clearing the state of the valid flag from the predetermined state when the corresponding test I/O request undergoes processing.

14. The method of claim 1, further comprising:
designating one or more test I/O requests on the exerciser initiation queue as available for I/O processing;
monitoring for the test I/O requests on the exerciser initiation queue that have been designated as available for I/O processing; and
wherein processing the test I/O requests comprises processing the test I/O requests that have been designated as available for I/O processing as determined by the monitoring.

15. The method of claim 14, further comprising:
establishing an exerciser status queue corresponding to an operating status queue used by the processing system during normal I/O processing;
entering status entries corresponding to the test I/O requests on the exerciser status queue;
designating one or more status entries on the exerciser status queue as completed test I/O requests;
monitoring for status entries on the exerciser status queue that have been designated as completed test I/O requests; and
processing test results for the completed test I/O requests identified in response to the monitoring for status entries designated as completed test I/O requests.

16. A system for testing input/output (I/O) transactions, comprising:
one or more I/O devices;
an I/O module coupled to the I/O devices;
a test initiation queue partitioned in memory separate from an operating initiation queue used to process I/O requests during normal I/O transaction processing;
an exerciser tester coupled to the I/O module to provide test I/O requests directly to the I/O module by way of the test initiation queue; and
wherein the I/O module processes the test I/O requests on the test initiation queue.

17. The system as in claim 16, wherein the exerciser tester comprises a plurality of device exerciser tester modules, one for each category of the I/O devices.

18. The system as in claim 17, wherein one of the categories of the I/O devices comprises a tape device category, and wherein the plurality of exerciser tester modules comprises a tape exerciser tester module to provide tape transaction requests to the I/O module by way of the test initiation queue.

19. The system as in claim 18, wherein the I/O module processes the tape transaction requests in connection with one or more tape devices associated with the tape device category.

20. The system as in claim 17, wherein one of the categories of the I/O devices comprises a disk device category, and wherein the plurality of exerciser tester modules comprises a disk exerciser tester module to provide disk transaction requests to the I/O module by way of the test initiation queue.

21. The system as in claim 20, wherein the I/O module processes the disk transaction requests in connection with one or more disk devices associated with the disk device category.

22. The system as in claim 17, wherein the exerciser tester comprises a common setup module comprising at least a portion of a plurality of the device exerciser tester modules.

23. The system as in claim 16, wherein the memory comprises a memory shared by an operating system used during normal I/O transaction processing and the exerciser tester used during testing of the I/O transactions.

24. The system as in claim 16, wherein the I/O module and the exerciser tester operate under a common operating system, and wherein the memory comprises a memory shared by the operating system used during normal I/O transaction processing and the exerciser tester used during testing of the I/O transactions.

25. A method for testing input/output (I/O) operations in an I/O management system including a processing module and associated operating system, memory, and one or more I/O components, the method comprising:
entering test I/O requests on an exerciser initiation queue via a request generator, wherein the exerciser initiation queue is created in memory available to the operating system during normal I/O processing and unavailable to the operating system during testing;
processing the test I/O requests on the exerciser initiation queue;
entering status entries on an exerciser status queue, wherein each of the status entries corresponds to an associated one of the test I/O requests entered on the exerciser initiation queue;
monitoring the status entries to identify the test I/O requests that have completed I/O processing; and
processing test results associated with the test I/O requests that have completed I/O processing.

26. The method of claim 25, wherein at least one of the test I/O requests includes a data transaction request, and wherein processing test results comprises verifying data affected by the data transaction request.

27. The method of claim 26, wherein verifying data comprises comparing the data associated with the data transaction request with expected data.

28. The method of claim 25, wherein processing test results comprises comparing performance attributes of a plurality of I/O management system instantiations processing a common set of one or more of the test I/O requests.

29. The method of claim 25, further comprising collecting statistics for multiple instantiations of the I/O management system which performs the processing of the test I/O requests, and comparing the test I/O request processing durations of the respective instantiations to determine relative performance of the multiple instantiations.

30. The method of claim 25, wherein processing test results comprises:
(a) obtaining a plurality of I/O existence durations for a corresponding plurality of instantiations of the I/O management system which processes the test I/O requests, wherein obtaining each of the I/O existence durations comprises:
(i) determining a start time in which processing of the test I/O request is initiated;
(ii) determining an end time in which processing of the test I/O request is completed;
(iii) determining the I/O existence duration from the difference between the end time and the start time; and
(b) comparing two or more of the plurality I/O existence durations to determine relative performance characteristics between the corresponding plurality of I/O management system instantiations.

* * * * *